June 14, 1949.  C. J. LUCIA ET AL  2,473,157
TRANSMISSION MECHANISM

Filed March 15, 1945  2 Sheets-Sheet 1

INVENTORS
Carroll J. Lucia
BY Forest R. McFarland

Tibbetts & Hart
ATTORNEYS

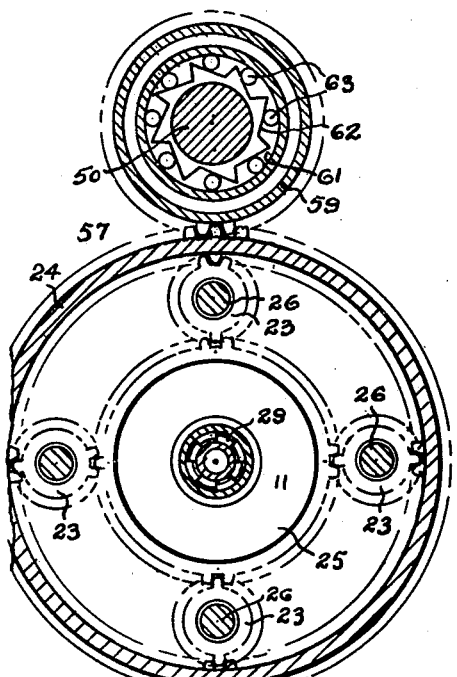
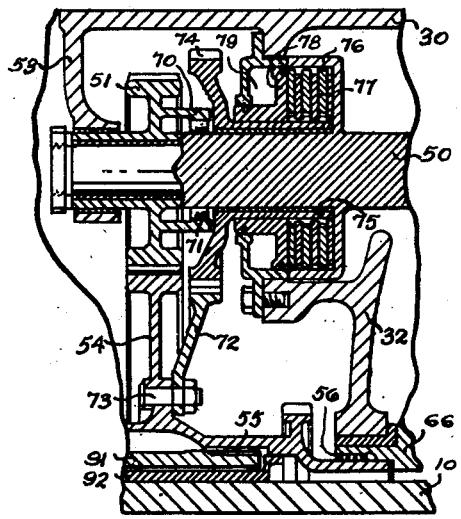
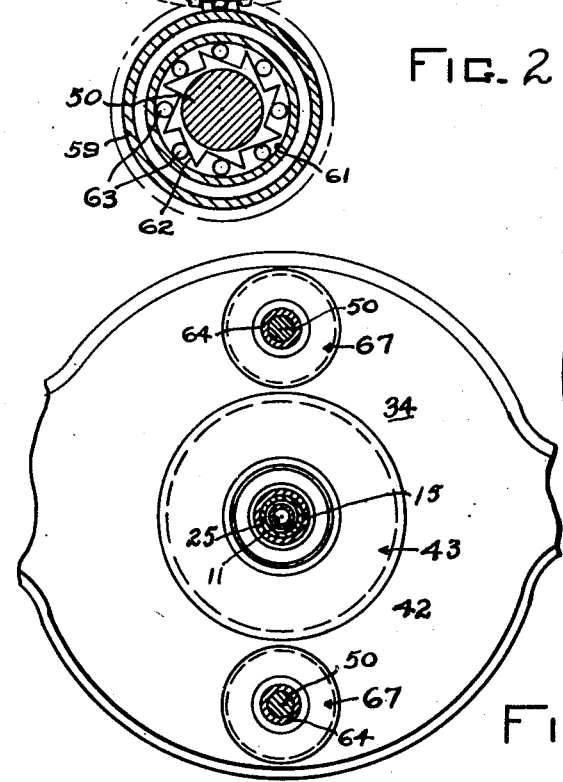
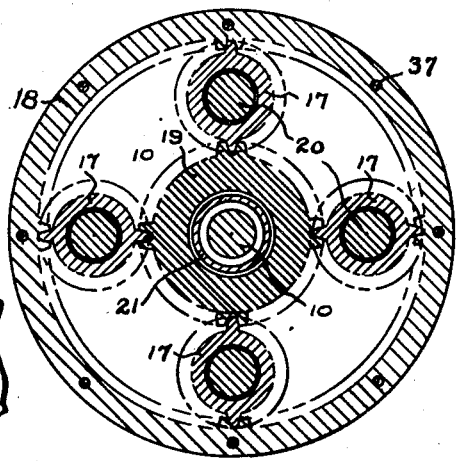

Patented June 14, 1949

2,473,157

UNITED STATES PATENT OFFICE 2,473,157

TRANSMISSION MECHANISM

Carroll J. Lucia, Toledo, Ohio, and Forest R. McFarland, Huntington Woods, Mich., assignors to Packard Motor Car Company, Detroit, Mich., a corporation of Michigan Application March 15, 1945, Serial No. 582,892

7 Claims. (Cl. 74—681)

This invention relates to transmission mechanism and more particularly to compound epicyclic gearing.

An object of the invention is to provide a balanced multi-speed transmission mechanism.

Another object of the invention is to provide a multi-speed transmission mechanism having epicyclic gearing with regenerative power means associated therewith to establish at least one of the driving speeds.

Another object of the invention is to provide compound epicyclic gearing with control mechanism for establishing a plurality of stepped-up driving speeds from an input member to an output member.

Other objects of the invention will appear from the following description taken in connection with the drawings, which form a part of this specification, and in which:

Fig. 2 is a sectional view taken on line 2—2 of Fig. 1;

Fig. 3 is a reduced sectional view taken on line 3—3 of Fig. 1;

Fig. 4 is a sectional view taken on line 4—4 of Fig. 1;

Fig. 5 is a sectional view of mechanism associated with the mechanism in Fig. 1 for obtaining additional driving speeds.

Figure 1:
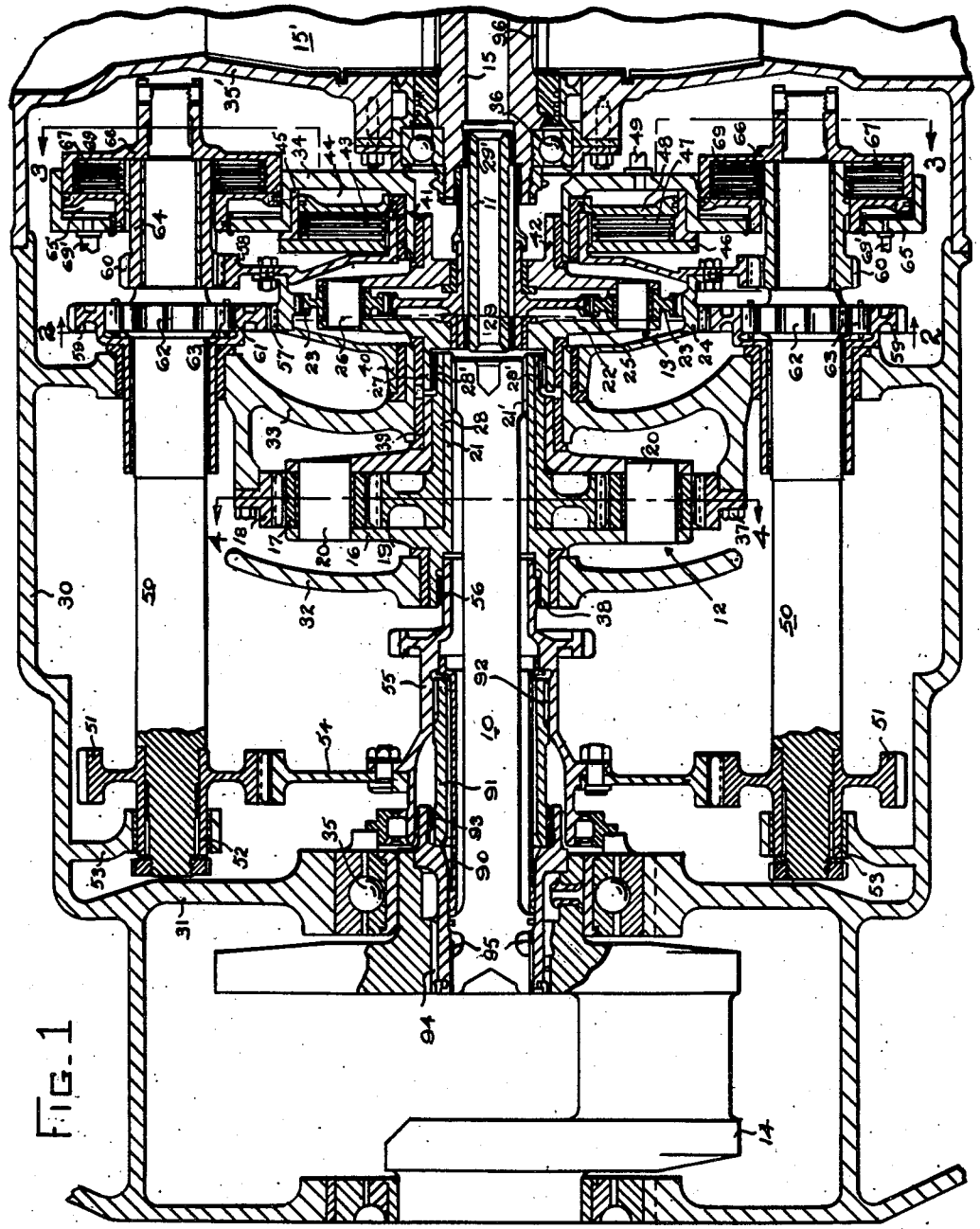
Fig. 1 is a longitudinal sectional view through a multi-speed drive mechanism incorporating the invention.

Referring now to the drawings by characters of reference, power input means is connected to power output means by epicyclic gearing that may consist of one or more planetary gear sets. The power input means may consist of a drive shaft 10 and/or adapter sleeves 90 and 91 splined together at 93. Such input means are driven by crankshaft 14, sleeve 90 being splined at 94 to the crankshaft and drive shaft 10 being splined at 95 to sleeve 90. The epicyclic gearing is illustrated as comprising two planetary gear sets 12 and 13 connected in series and both arranged to step-up the drive but in some cases where a slower speed result is desired a single planetary gear set could be used. The output means may be a driven shaft suitable for various purposes, such as for driving a shaft 15 having an engine supercharger impeller 15' fixed thereto by splines 96.

The two planetary gear sets will be referred to generally as the power input gear set 12 and the power output gear set 13. The input gear set 12 is comprised of a carrier or cage 16, planet gears 17, ring gear 18 and sun gear 19, the planet gears being rotatably mounted on pins 20 fixed to the carrier. The carrier has a hub portion 21 splined as at 21' to the end of the input shaft member 10.

Output gear set 13 is comprised of carrier or cage 22, planet gears 23, ring gear 24 and sun gear 25, the planet gears being rotatably mounted on pins 26 fixed to the carrier. This cage 22 has a flange extension 27 splined at 28' to an extension 28 of the sun gear of the input gear set. Sun gear 25 is splined at 29 to the output shaft member 11. When a single gear set is employed gear set 13 will be utilized and its cage will be secured to the power input shaft 10. Shaft 11 is splined at 29' to shaft 15.

The epicyclic change speed gearing is housed in casing 30 having walls 31, 32, 33 and 34 extending transversely therein. Bearing 35 in wall 31 supports the output end of the crankshaft 14 and bearing 36 in wall 35' supports the shaft 15. Walls 32, 33 and 34 provide supports for the epicyclic gearing, and ring gear 18 of the input gear set is fixed to wall 33 by bolts 37. Wall 32 serves to support an extended hub flange 38 of the cage for the input planetary gear set. An extension 39 of cage 16 and an extension 40 of ring gear 24 and extension 27 are supported by wall 33. An extension 41 of ring gear 24 and an extension 42 of cage 22 are supported by wall 34.

As ring gear 18 of the input planetary gear set is held stationary with the casing, this gear set will have a fixed ratio that is designed to step up the drive from the input shaft 10 and cage 16 to the sun gear 19. As the gear sets are connected in series, this stepped-up drive will be applied to the output gear set. The output gear set is designed to step-up the speed of the drive from the input gear set to the driven shaft at a plurality of selected ratios through means controlling rotation of ring gear 24. One of these controls consists of means for holding ring gear 24 stationary with wall 34 through the medium of a brake device 43. Wall 34 is flanged to provide a central chamber 44 into which ring gear extension 41 projects and a sleeve 45 extends around the outer portion of the chamber and has a flange overlying the open end thereof. A cover plate 46 overlies the flange of the sleeve 45 and the plate and flange are suitably secured to wall 34. Brake plates 47 are housed in chamber 44 and are alternately splined to ring gear extension 41 and to sleeve 45. The brake plates may be engaged by a piston 48 actuated by suitably controlled fluid under pressure flowing through conduit 49 that is connected with a suitable source of supply.

The drive from the input gear set is changed through the output gear set and the drive is preferably further stepped-up, although the speed of the drive through the gear sets could be stepped-down. When brake 43 is engaged holding ring gear 24 stationary, the gearing is conditioned for the highest speed drive and power flows entirely and directly through the gear sets, the reactions being taken by walls 34 and 33. As shown, the drive will be stepped-up approximately eight times from shaft 10 to shaft 11 in high speed.

The epicyclic gearing is provided with regenerative power means for establishing lower driving speeds through the output gear set. Such means is effective only when the brake 43 is released and, as shown in Figs. 1 to 4, is of a selective two ratio type. Such regenerative power means consists of mechanisms connecting the input power means rotating at crankshaft speed with ring gear 24, the mechanisms being controlled to selectively establish either one of the two gear ratios. This regenerative power means consists of two similar balanced drive mechanisms parallel with and disposed oppositely with respect to the axes of the gear sets. Only one of these two mechanisms will be described, but similar numerals will be used to designate similar parts of both mechanisms.

Lay shaft 50 is supported by wall 33 and carries a gear 51 having an extension 52 splined thereto and supported in a portion 53 of the casing 30. Gear 51 meshes with gear 54 fixed to sleeve 55 that is splined at 56 to cage 16 of the input gear set and at 92 to sleeve 91 splined at 93 to adapter 90. These two connections or either one of them will drive the gear 54 at crankshaft speed. Lay shaft 50 is drivingly connected with the output gear set ring gear 24 through either one of two sets of gearing having different gear ratios. Ring gear 24 is formed with external gear 57 and ring gear extension 41 is formed with external gear 58. Gear 57 meshes with gear 59 and gear 58 meshes with gear 60. Gears 59 and 60 are loosely mounted on the lay shaft 50 and are selectively fixed therewith by clutch means.

Gear 59 is formed with an annular inner surface 61 surrounding cam surfaces 62 on the lay shaft and overrunning clutch rollers 63 are arranged between the gear surface and the cam surfaces. Such connection is a conventional overrunning clutch that will automatically engage when conditions so dictate. The ratio of gears 57 and 59 is lower than that of gears 58 and 60 so that the overrunning clutch will be automatically engaged when the drive from gears 60 to the lay shaft is disconnected.

Gear 60 may be fixed to the lay shaft by a friction clutch 67. Gear 60 has a sleeve extension 64 projecting into clutch chamber 65 formed in wall 34 and into the flanged end of clutch member 66 splined to lay shaft 50. Clutch plates 69 are alternately splined to sleeve 64 and clutch element 66 and may be engaged by piston 65 actuated by fluid under pressure entering chamber 65 through conduit 69'. A suitable source of fluid supply and fluid control means may be employed to regulate engagement and disengagement of the clutch.

With the mechanism so far described three speeds can be obtained. In all three speeds the input planetary gear set will operate at a constant speed ratio to step-up the drive from shaft 10 to the output planetary gear set. As the ring gear 18 is stationary and the cage 16 is rotated in a clockwise direction with shaft 10, planet gears 17 will rotate anticlockwise on pins 20 and will drive sun gear 19 in a clockwise direction at an increased speed, the planet gears moving bodily in a clockwise direction. Shafts 50 will be driven in a counterclockwise direction and at an increased speed from the power input means through the gear trains consisting of gear 54 and gears 51. Under all operating conditions, the lay shafts 50 and sun gear 19 will be driven at an increased speed from the input power means. In all three speeds the output planetary gear set will step-up the drive to shaft 11. The highest driving speed is obtained by engaging brake 43 to hold ring gear 24 stationary. Cage 22 is always driven clockwise by sun gear 19, and planet gears 23 will rotate in a counterclockwise direction on their pins 26 but will be carried bodily in a clockwise direction so that the drive to sun gear 25 splined to shaft 11 is stepped-up. When ring gear 24 is held stationary for the highest speed drive, clutches 67 will be released and shafts 50 will overrun gears 59 and 60.

Intermediate speed is obtained when brake 43 is released and clutches 67 are engaged. Carrier 22 is rotated in a clockwise direction due to its splined connection with sun gear sleeve 28 creating a clockwise reaction on the ring gear 24 which will cause the ring gear 24 to move in a clockwise direction at a speed regulated by the gear ratio of gears 58 and 60 so that the speed of the drive transmitted to the sun gear splined to shaft 11 will be less than the highest speed when brake 43 is engaged. The reaction force flows from the ring gear 24 through gears 58 and 60 to shafts 50 and through the gears 51 and 54 back to the power input means providing a regenerative power system. While the clutches 67 are engaged to provide intermediate driving speed, the shafts 50 will overrun gears 59 because the gear ratio of gears 59 and 57 is lower than that of gears 58 and 60.

When the lowest stepped-up driving speed is desired, brake 43 and clutches 67 are released and the clockwise reaction of ring gear 24 is then transmitted to the constant speed shafts 50 through the gears 57 and 59 and under this condition the ring gear forward rotation will be retarded less than when clutches 67 are engaged so that the driving speed transmitted through the planetary gears 23 to the sun gear 25 and shaft 11 will be lower than when the mechanism is conditioned for intermediate driving speed.

The structure so far described provides three driving speeds but as shown in Fig. 5, additional speeds may be obtained by the addition of gear trains between the lay shafts and the cage of the input gear set. Overrunning clutches are arranged between gears 51 and lay shafts 50. The gears 51 are formed with flanges 70 having interior cam faces engaged by rollers 71 which also engage shaft 50. Gears 72 are fixed to gears 54 by bolts 73 and mesh with gears 74 rotatably mounted on lay shafts 50. Gears 74 have sleeves 75 extending parallel with flanges 76 on the lay shafts. Clutch plates 77 are alternately splined to sleeves 75 and flanges 76. The plates may be engaged by pistons 78 actuated by fluid pressure connected with chambers 79 in a conventional manner.

The additional gear trains comprised of gears 72 and 74 between the input power means and the lay shafts together with clutches 77 provide for two more driving speeds through the transmission mechanism previously described. First, third and fifth speeds correspond to the three speeds obtainable with the structure in Figs. 1 to 4, and second and fourth speeds are added by the structure in Fig. 5.

With the structure shown in Fig. 5 incorporated with the structure in Fig. 1, the highest speed, of fifth speed, will be obtained by engaging brake 43. Clutches 77 may be engaged or disengaged as the lay shafts will overrun gear 59, and gear 60 will idle with clutches 67 disengaged. The next highest or fourth speed drive is obtained by releasing brake 43 and engaging clutches 67 and 77. The reaction force will flow through gears 58 and 60 to lay shafts 50 and through gears 74 and 72 back to the power input means, the lay shafts overrunning gears 51, and being overrun by gears 59. The next highest or third speed drive is obtained by engaging the front clutches 77 in which event gears 57 and 59 will be drivingly connected with the lay shafts through overrunning clutches 63 and the lay shafts will be overrun by gears 51 and the lay shafts will be drivingly connected with the power input means through gears 74 and 72. The next highest or second speed drive is obtained by engaging the clutches 67 which will drivingly connect gears 59 and 60 with the lay shafts and overrunning clutch rollers 71 will connect gears 51 with the lay shafts and the regenerative power thus flows to the power input means. Gears 74 will idle and the lay shafts will overrun gears 59. The low or first speed is obtained by disengaging clutches 67 and 77 whereupon gears 60 and 74 will idle and overrunning clutches 63 and 71 will become effective to establish the regenerative power flow through gears 57, 59, 51 and 54. It will be understood that brake 43 is released except in fifth or high speed drive. It will be seen that such structure makes provision for holding gear 24 stationary for top speed and that in the four lower speeds rotation of the output ring gear 24 can be selectively varied through the several gear ratios of the regenerative power means.

The dual oppositely disposed mechanisms for connecting the input and output gear sets to establish the lower speed drives provide a balanced drive through the structure.

It will be understood that various forms of the invention other than those described above may be used without departing from the spirit or scope of the invention.

What is claimed is:

1. A variable speed transmission comprising a driving shaft, a driven shaft, speed ratio varying means interposed between the driving and driven shafts and including a power input gear set and a power output gear set, the power input gear set having a nonrotatable ring gear, a planet carrier operably connected to the driving shaft, and a driving sun gear, the power output gear set having a planet carrier operably connected to the sun gear of the power input gear set, a sun gear operably connected to the driven shaft, and a rotatable ring gear, a plurality of spaced ring gear control shafts extending parallel with and operably connected to the driving shaft, one-way driving means between the ring gear and the control shafts, and manually operable braking means to lock said ring gear against rotation.

2. In a variable speed transmission, a housing, a driving shaft, a driven shaft, speed ratio varying means interposed between the driving and driven shafts and comprising a pair of planetary gear sets connected in series, the first planetary gear set having a ring gear fixed to the housing, a planet carrier driven by the driving shaft, and a sun gear, the second planetary gear set having a planet carrier driven by the sun gear of the first planetary gear set, a sun gear connected to the driven shaft, and a rotatable ring gear, a pair of spaced layshafts extending parallel to the driving shaft, gearing connecting the layshafts to the driving shaft, one-way driving means between the ring gear and the layshafts, and manually operable braking means to lock said ring gear against rotation.

3. A variable speed transmission comprising a housing, a driving shaft, a driven shaft, speed ratio varying means interposed between the driving and driven shafts and including a pair of planetary gear sets connected in series, the first planetary gear set having a ring gear fixed to the housing, a planet carrier driven by the driving shaft, and a sun gear, the second planetary gear set having a planet carrier driven by the sun gear of the first planetary gear set, a sun gear operably connected to the driven shaft, and a rotatable ring gear, a plurality of spaced layshafts extending parallel to the driving shaft, gearing connecting the layshafts to the driving shaft, manually operable braking means to lock said ring gear against rotation, a plurality of geared connections of different ratios between the ring gear and the layshafts, one-way driving means in each of said geared connections, and manually operable clutching means to render one of said geared connections inoperable to regenerate torque reaction from the ring gear through the layshafts to the driving shaft.

4. A variable speed transmission comprising a driving shaft, a driven shaft, regenerative speed ratio varying means interposed between the driving and driven shafts and comprising a pair of gear sets connected in series, the first gear set having a nonrotatable ring gear, a planet carrier operably connected to the driving shaft, and a sun gear, the second gear set having a planet carrier driven by the sun gear of the first gear set, a sun gear operably connected to the driven shaft, and a controllable ring gear, a plurality of spaced ring gear control shafts extending parallel to the driving shaft, multiple ratio gearing connecting the ring gear control shafts to the driving shaft, manually operable means to select one of said multiple ratio gear connections, multiple ratio one-way driving means between the ring gear and the ring gear control shafts, manually operable means to select one of said multiple ratio driving means, and manually operable braking means to lock said ring gear against rotation.

5. In a transmission having driving and driven shafts, a fixed ratio driving planetary gear set comprising a nonrotatable reaction member, a rotatable element operably connected to the driving shaft, and a driven element, a variable ratio driving planetary gear set comprising a rotatable reaction member, a rotatable element operably connected to the driven element of the fixed ratio driving planetary gear set, and another rotatable element operably connected to the driven shaft, a plurality of spaced reaction member control members operably connected to the driving shaft and to the rotatable reaction member, one-way driving means associated with the reaction member control members to redirect driving torque from the reaction member to the driving shaft under certain conditions of operation, and manually operable means to lock the reaction member against rotation.

6. A transmission comprising driving and driven shafts, a fixed ratio driving planetary gear set having a rotatable element operably connected to the driving shaft, a driven element, and a nonrotatable reaction member, a variable ratio driving planetary gear set having a rotatable element operably connected to the driven element of the fixed ratio driving planetary gear set, another rotatable element operably connected to the driven shaft, and a rotatable reaction member, a plurality of reaction member control shafts geared to the driving shaft and to the rotatable reaction member to provide a plurality of gear ratio controls for the reaction member, one-way driving means associated with the reaction member control shafts to redirect driving torque from the reaction member to the driving shaft under certain conditions of operation, manually operable means to select a desired gear ratio control of the reaction member to vary the speed ratio of the drive from the driving shaft to the driven shaft, and manually operable means to lock the reaction member against rotation.

7. In a transmission having driving and driven shafts, a fixed speed increasing planetary gear set driven by the driving shaft, a variable speed increasing planetary gear set driven by the fixed speed planetary gear set, connecting means between the variable speed increasing planetary gear set and the driven shaft, the fixed speed planetary gear set having a nonrotatable reaction member and the variable speed increasing planetary gear set having a rotatable reaction member, brake means to lock the rotatable reaction member to provide a high speed increasing drive through the variable speed increasing planetary gear set, spaced layshafts geared to the driving shaft, two selectively operable geared means of different speed ratios between the layshafts and the rotatable reaction member to drive said member at different speed ratios relative to the speed of the driving shaft to vary the speed ratio drive from the driving shaft to the driven shaft, and separately operable friction clutch and mechanical one-way clutching means between the layshafts and said geared means of different speed ratios to drive the rotatable reaction member at different speed ratios to provide intermediate and low speed increasing drives through the variable speed increasing planetary gear set.

CARROLL J. LUCIA.
FOREST R. McFARLAND.

REFERENCES CITED

The following references are of record in the file of this patent:

UNITED STATES PATENTS

| Number | Name | Date |
|---|---|---|
| 1,282,495 | Tornberg | Oct. 22, 1918 |
| 1,648,969 | Stuart | Nov. 15, 1927 |
| 1,717,018 | Ferrari | June 11, 1929 |
| 2,301,072 | Nardone | Nov. 3, 1942 |

FOREIGN PATENTS

| Number | Country | Date |
|---|---|---|
| 144,349 | Great Britain | June 10, 1920 |
| 362,192 | Italy | Aug. 17, 1938 |
| 544,335 | Great Britain | Apr. 9, 1942 |